United States Patent Office 3,467,747
Patented Sept. 16, 1969

3,467,747
METHOD OF PRODUCING A MEANS OF EXTERMINATING WARTS
Sven Hammarskjöld, Partille, and Curt Yngve Lenne, Mölndal, Sweden, assignors to Aktiebolaget Bofors, Bofors, Sweden
No Drawing. Filed May 24, 1966, Ser. No. 552,419
Claims priority, application Sweden, May 26, 1965, 6,926/65; May 18, 1966, 6,880/66
Int. Cl. A61k 27/00
U.S. Cl. 424—81          1 Claim The present invention relates to a method of exterminating warts. In order to remove warts of different kinds caused through infection by virus, a number of methods are used, purely surgical as well as treatment with pharmaceutical preparations or X-ray treatment. None of these methods are considered to give satisfactory results. The surgical methods often present problems in their postoperative stage, as many warts often cause bleeding and there can be risks for infections. In comparatively many cases, the warts return, owing to the fact that all sources of infection cannot be removed. At treatment with pharmaceutical preparations, it has been found that satisfactory results are obtained in approximately 50% of the cases, which almost exactly corresponds to the spontaneous healing through individual formation of immunity through the production of antibodies. It has also been possible to obtain such results by covering warts with plastic films or collodion containing pharmaceutical preparations. Thus, therapeutically and cosmetically seen, it has not yet been possible to develop satisfactory methods for treating warts. In addition to this there is, of course, the difficulties involved in applying pharmaceutical products to warts, and in this respect, warts on feet have sometimes posed extremely complicated problems.

The purpose of the present invention is to create a method of producing a new means of exterminating warts, with the aid of which warts can be exterminated more efficiently than previously. In more detail, the new method consists in that both salicylic acid and podophyllin, preferably podophyllin purified, are added to a solution of plastic which is compatible with tissue. The solution thus obtained is brushed or sprayed on the warts. After the solvent has evaporated, a film is formed over the wart.

It is previously known that salicylic acid itself, as well as acrylate, does not have any effect on warts, and that the viricidal effect of podophyllin or podophyllin purified is not sufficient for complete healing either. However, it has now, surprisingly, proved that a mixture of these components gives significantly improved healing, which is nearly 100%. Tests have been carried out on a number of patients in such a way that plastic solutions, in a double blind study, have been brushed upon a selected and comparative number of warts on the same patient. The results obtained with solution which contained both podophyllin, preferably podophyllin purified, and salicylic acid in the plastic differed significantly from the results obtained with the solutions with only plastic, salicylic acid or podophyllin or podophyllin purified. At clinical tests on severe cases during a somewhat longer time, at least 90% healing has been obtained. The means used is manufactured according to the method described in the following. It is then conceivable to use other solvents and additives in order to improve the penetration.

EXAMPLE 20 g. of podophyllin, preferably podophyllin purified, and 10 g. of salicylic acid is dissolved slowly, while stirring, in a solution of 70 g. of 25% polymethyl ethoxy butyl acrylate in ethyl acetate. It can take a few hours before the mixture is dissolved, after which the solution is ready for use.

What is claimed is:
1. Method of exterminating warts consisting of the step of brushing or spraying on the warts an ethyl acetate solution of polymethyl ethoxy butyl acrylate which by itself does not have any effect on warts, having admixed therein an amount of salicylic acid which by itself does not have a sufficient viricidal effect for the complete healing of warts, and an amount of purified podophyllin which by itself does not have a sufficient viricidal effect for the complete healing of warts either.

References Cited

UNITED STATES PATENTS

| 204,729 | 9/1884 | Hentz | 167—61 |
| 3,161,566 | 12/1964 | Turkewitsch | 167—61 |

OTHER REFERENCES

Lesser: Drug and Cosmetic Industry, 65 (5), 514–515, 592–595, November 1949.
Ignatoft: J. Nat. Assoc. Chiropodists, 44 (7), 37–47, July 1954.

LEWIS GOTTS, Primary Examiner
S. K. ROSE, Assistant Examiner

U.S. Cl. X.R.
424—195, 230, 234